US010222885B2

(12) United States Patent
Lee et al.

(10) Patent No.: US 10,222,885 B2
(45) Date of Patent: Mar. 5, 2019

(54) DISPLAY DEVICE WITH INTEGRATED TOUCH SCREEN AND DRIVING METHOD THEREOF (71) Applicant: LG Display Co., Ltd., Seoul (KR)

(72) Inventors: Sung Yub Lee, Busan (KR); Seung Eun Pyo, Incheon (KR)

(73) Assignee: LG Display Co., Ltd., Seoul (KR)

(*) Notice: Subject to any disclaimer, the term of this patent is extended or adjusted under 35 U.S.C. 154(b) by 4 days.

(21) Appl. No.: 14/574,647

(22) Filed: Dec. 18, 2014

(65) Prior Publication Data
US 2015/0185941 A1 Jul. 2, 2015

(30) Foreign Application Priority Data
Dec. 31, 2013 (KR) .......................... 10-2013-0169482

(51) Int. Cl.
G06F 3/041 (2006.01)
G09G 3/20 (2006.01)
(Continued)

(52) U.S. Cl.
CPC ............ *G06F 3/0412* (2013.01); *G06F 3/044* (2013.01); *G06F 3/0416* (2013.01); *G09G 3/20* (2013.01);
(Continued)

(58) Field of Classification Search
CPC ........ G06F 3/0412; G06F 3/0416; G09G 3/36
See application file for complete search history.

(56) References Cited

U.S. PATENT DOCUMENTS 5,410,329 A * 4/1995 Tagawa ................. G06F 3/0412
345/104
5,684,505 A * 11/1997 Takita ................... G06F 3/0412
345/104
(Continued)

FOREIGN PATENT DOCUMENTS

CN 102135837 A 7/2011
CN 102375637 A 3/2012
(Continued)

OTHER PUBLICATIONS

The First Office Action dated Apr. 1, 2017 from The State Intellectual Property Office of the People's Republic of China in counterpart Chinese application No. 201410805059.8.

Primary Examiner — Nitin Patel
Assistant Examiner — Robert M Stone
(74) Attorney, Agent, or Firm — Morgan, Lewis & Bockius LLP (57) ABSTRACT A display device with an integrated touch screen and a method of driving the same are provided. The display device includes a panel configured to operate in a first display operation period, a first touch operation period, a second display operation period, and a second touch operation period, and include a touch electrode overlapping a plurality of gate lines and a plurality of data lines, and a gate driver configured to sequentially apply a gate-on voltage to an odd-numbered gate line among the plurality of gate lines during two horizontal periods in the first display operation period, and in the second display operation period, sequentially apply the gate-on voltage to an even-numbered gate line among the plurality of gate lines during two horizontal periods.

17 Claims, 8 Drawing Sheets (51) Int. Cl.
*G06F 3/044* (2006.01)
*G02F 1/1333* (2006.01)

(52) U.S. Cl.
CPC . *G02F 1/13338* (2013.01); *G09G 2310/0227* (2013.01)

(56) References Cited

U.S. PATENT DOCUMENTS

| | | | | |
|---|---|---|---|---|
| 5,923,320 A * | 7/1999 | Murakami | ............ | G06F 3/044 345/173 |
| 2004/0196232 A1* | 10/2004 | Kim | ............ | G09G 3/3614 345/89 |
| 2006/0201931 A1* | 9/2006 | Lee | ............ | G02F 1/13338 219/497 |
| 2007/0097057 A1* | 5/2007 | Shin | ............ | G09G 3/3614 345/98 |
| 2009/0256785 A1* | 10/2009 | Sung | ............ | G09G 3/3258 345/77 |
| 2010/0013791 A1* | 1/2010 | Haga | ............ | G06F 3/0412 345/174 |
| 2010/0118013 A1* | 5/2010 | Kitayama | ............ | G09G 3/3614 345/211 |
| 2010/0164915 A1* | 7/2010 | Kim | ............ | G09G 3/3677 345/205 |
| 2010/0283765 A1* | 11/2010 | Gotoh | ............ | G06F 3/0412 345/175 |
| 2011/0074712 A1* | 3/2011 | Bak | ............ | G06F 3/0412 345/173 |
| 2011/0227884 A1* | 9/2011 | Chung | ............ | G09G 3/3266 345/204 |
| 2012/0044195 A1 | 2/2012 | Nakanishi et al. | | |
| 2012/0169629 A1 | 7/2012 | Shih et al. | | |
| 2012/0218482 A1* | 8/2012 | Hwang | ............ | G06F 3/044 349/12 |
| 2012/0242597 A1* | 9/2012 | Hwang | ............ | G06F 3/0412 345/173 |
| 2012/0262389 A1* | 10/2012 | Kida | ............ | G06F 3/0412 345/173 |
| 2013/0038591 A1* | 2/2013 | Yang | ............ | G09G 3/34 345/211 |
| 2013/0050130 A1* | 2/2013 | Brown | ............ | G06F 3/044 345/174 |
| 2013/0147724 A1* | 6/2013 | Hwang | ............ | G06F 3/0412 345/173 |
| 2013/0241868 A1* | 9/2013 | Kim | ............ | G09G 3/3685 345/174 |
| 2013/0285998 A1* | 10/2013 | Hong | ............ | G06F 3/038 345/212 |
| 2014/0049512 A1 | 2/2014 | Yang et al. | | |
| 2014/0111446 A1 | 4/2014 | Lee et al. | | |
| 2014/0111473 A1 | 4/2014 | Yang et al. | | |
| 2014/0160186 A1* | 6/2014 | Oh | ............ | G09G 3/3614 345/694 |
| 2014/0320427 A1* | 10/2014 | Lee | ............ | G06F 3/0416 345/173 |
| 2014/0347297 A1* | 11/2014 | Tsuji | ............ | G06F 3/0412 345/173 |
| 2015/0160766 A1* | 6/2015 | Park | ............ | G09G 3/3677 345/173 |

FOREIGN PATENT DOCUMENTS

| | | |
|---|---|---|
| CN | 102937852 A | 2/2013 |
| CN | 103279214 A | 9/2013 |
| KR | 101305924 B1 | 9/2013 |

* cited by examiner

DISPLAY DEVICE WITH INTEGRATED TOUCH SCREEN AND DRIVING METHOD THEREOF

CROSS-REFERENCE TO RELATED APPLICATIONS

This application claims the benefit of the Korean Patent Application No. 10-2013-0169482 filed on Dec. 31, 2013, which is hereby incorporated by reference as if fully set forth herein.

BACKGROUND OF THE INVENTION

Field of the Invention

The present invention relates to a display device, and more particularly, to a display device with an integrated in-cell type touch screen.

Discussion of the Related Art

Touch screens are a type of input device that is included in display devices such as liquid crystal display (LCD) devices, field emission displays (FEDs), plasma display panels (PDPs), electroluminescent displays (ELDs), and electrophoretic displays (EPDs), and enables a user to input information by directly touching a screen with a finger, a pen or the like while looking at the screen of the display device.

Particularly, the demand for display devices with integrated in-cell type touch screens, which include a plurality of built-in elements configuring the touch screen for slimming portable terminals such as smart phones and tablet personal computers (PCs), is recently increasing.

The display devices with integrated in-cell type touch screens are time-division driven in a display operation period and a touch operation period in order for a common electrode to perform a function of a touch electrode.

Moreover, since the display devices with integrated in-cell type touch screens recently use an interlacing method in which the display operation period is divided for increasing a touch report rate, a gate-on time that is a time when a data voltage is output is not optimized for an interlacing operation, and for this reason, the gate-on time is reduced, causing a degradation in a quality of a displayed image.

SUMMARY OF THE INVENTION

Accordingly, the present invention is directed to provide a display device with an integrated in-cell type touch screen and a driving method thereof that substantially obviate one or more problems due to limitations and disadvantages of the related art.

An object of the present invention is to provide a display device with an integrated touch screen, which can increase a gate-on time and thus improve a quality of a displayed image.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, a display device with an integrated touch screen includes a panel configured to operate in a first display operation period, a first touch operation period, a second display operation period, and a second touch operation period, and include a touch electrode overlapping a plurality of gate lines and a plurality of data lines; and a gate driver configured to sequentially apply a gate-on voltage to an odd-numbered gate line among the plurality of gate lines during two horizontal periods in the first display operation period, and in the second display operation period, sequentially apply the gate-on voltage to an even-numbered gate line among the plurality of gate lines during two horizontal periods.

In another aspect, a method of driving a display device with an integrated touch screen includes a panel configured to operate in a first display operation period, a first touch operation period, a second display operation period, and a second touch operation period, and include a touch electrode overlapping a plurality of gate lines and a plurality of data lines; a gate driver; and a display driver IC, including: sequentially applying, by the gate driver, a gate-on voltage to an odd-numbered gate line among the plurality of gate lines during two horizontal periods in the first display operation period; and sequentially applying, by the gate driver, the gate-on voltage to an even-numbered gate line among the plurality of gate lines during two horizontal periods in the second display operation period.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE ILLUSTRATED EMBODIMENTS

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of the present invention will be described in detail with reference to the accompanying drawings.

In this disclosure below, for convenience of description, a display device with an integrated touch screen according to embodiments of the present invention will be exemplarily described as being an LCD device, but the present invention is not limited thereto. The present invention may be applied to various display devices such as FEDs, PDPs, ELDs, and EPDs. Also, a description on a general configuration of an LCD device is not provided.

Moreover, a display device with an integrated touch screen according to embodiments of the present invention may sense a touch in a mutual capacitance type or a self-capacitance type.

The display device with an integrated touch screen according to embodiments of the present invention operates in a first display operation period, a first touch operation period, a second display operation period, and a second touch operation period in each frame.

Hereinafter, embodiments of a mutual capacitance type will be described with reference to FIGS. 1 to 5, and embodiments of a self-capacitance type will be described with reference to FIGS. 6 to 8.

Figure 1:
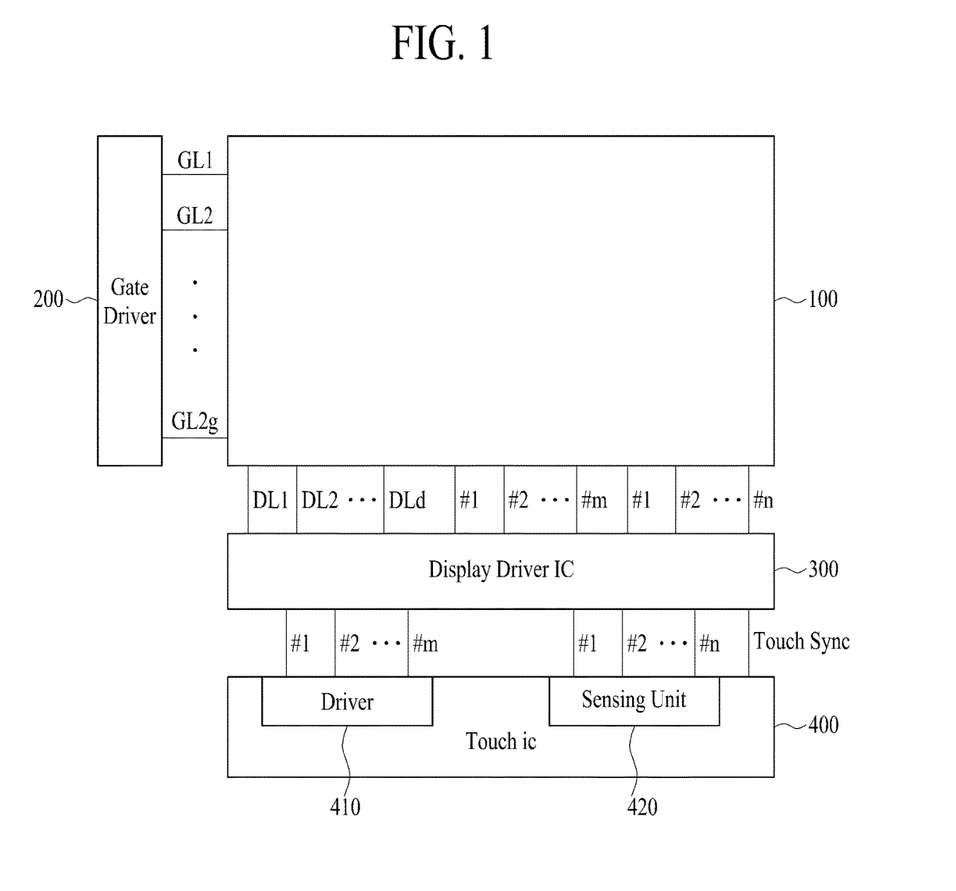
FIG. 1 is a diagram schematically illustrating a configuration of a display device with an integrated touch screen according to one of embodiments of the present invention.
Figure 2:
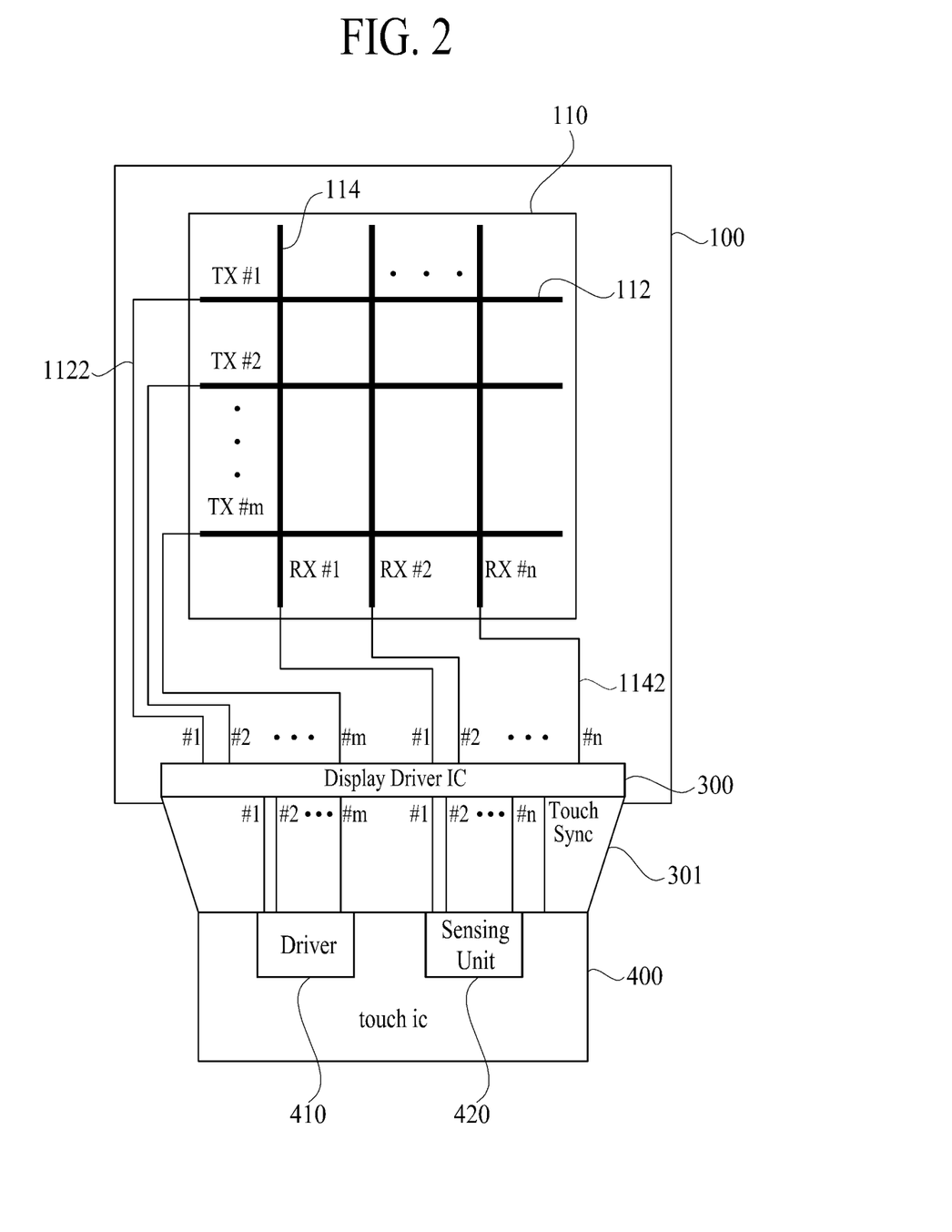
FIG. 2 is a diagram illustrating a schematic structure of a touch electrode built into a panel illustrated in FIG. 1.
Figure 3:
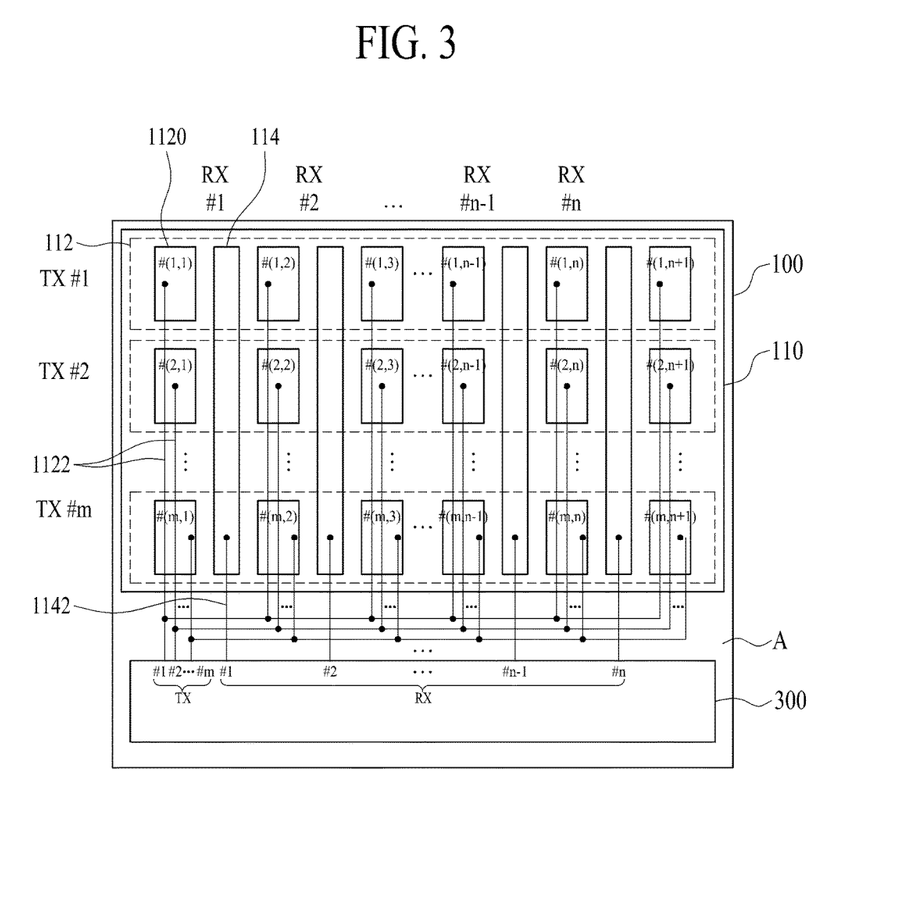
FIG. 3 is a diagram illustrating detailed shapes of a plurality of driving electrodes and a plurality of sensing electrodes illustrated in FIG. 2.
Figure 4:
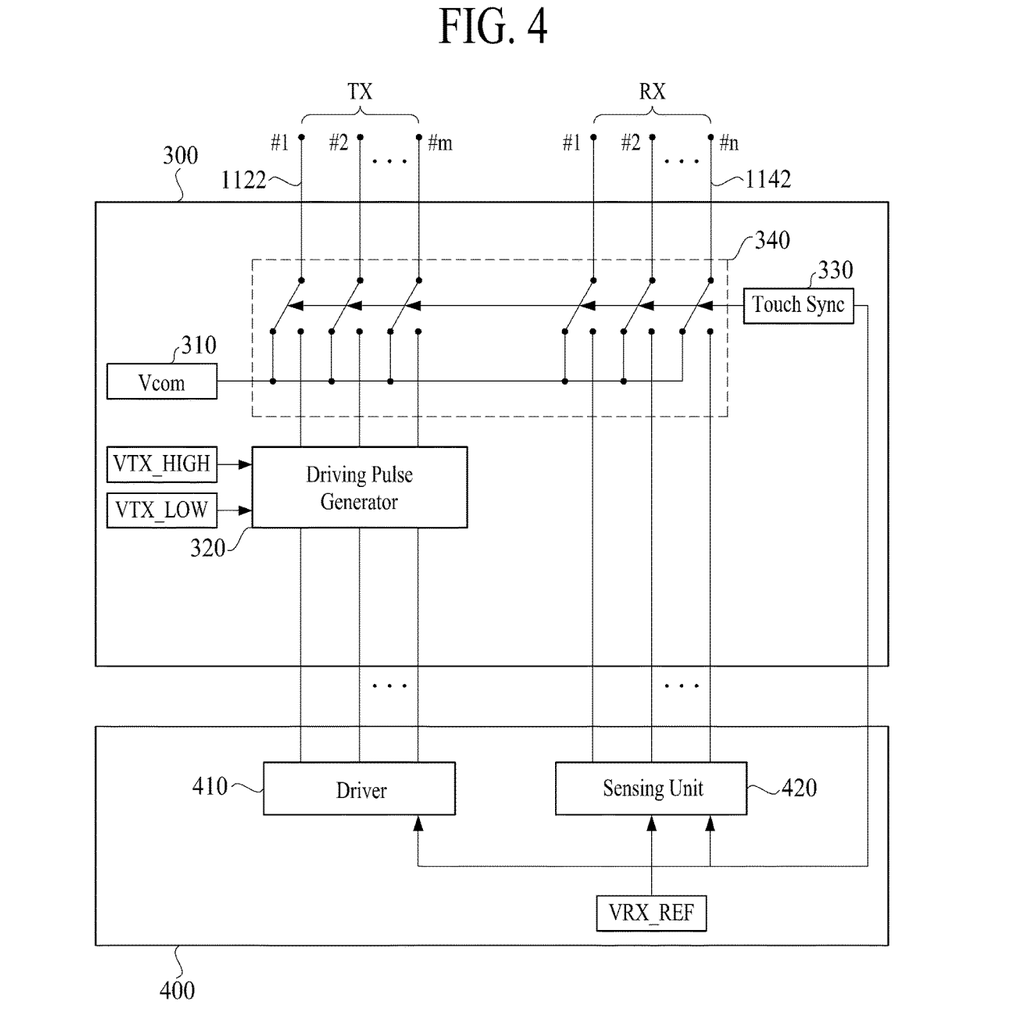
FIG. 4 is a diagram illustrating configurations of a display driver integrated circuit (IC) and a touch IC illustrated in FIG. 2.
Figure 5:
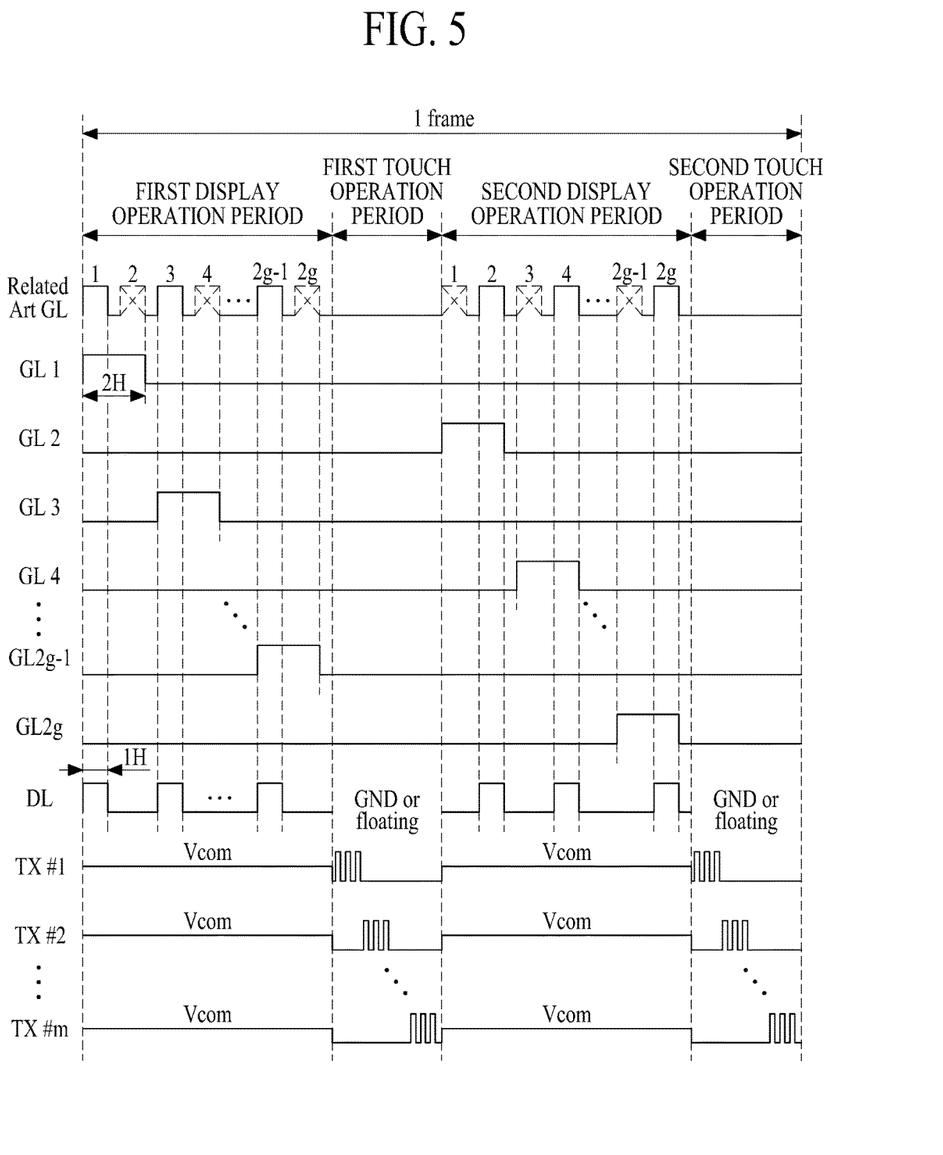
FIG. 5 is a timing chart for describing a method of driving the display device with an integrated touch screen illustrated in FIG. 1.

FIG. 1 is a diagram schematically illustrating a configuration of a display device with an integrated touch screen according to one of embodiments of the present invention. FIG. 2 is a diagram illustrating a schematic structure of a touch electrode built into a panel illustrated in FIG. 1. FIG. 3 is a diagram illustrating detailed shapes of a plurality of driving electrodes and a plurality of sensing electrodes illustrated in FIG. 2. FIG. 4 is a diagram illustrating configurations of a display driver integrated circuit (IC) and a touch IC illustrated in FIG. 2. FIG. 5 is a timing chart for describing a method of driving the display device with an integrated touch screen illustrated in FIG. 1.

As illustrated in FIG. 1, the display device with an integrated touch screen includes a panel 100, a gate driver 200, a display driver IC 300, and a touch IC 400.

The panel 100 includes a plurality of gate lines, a plurality of data lines, and a touch electrode which intersects the plurality of gate lines and the plurality of data lines.

For example, as illustrated in FIG. 2, a touch screen 110 including the touch electrode is built into the panel 100, and may include, as the touch electrode, a plurality of driving electrodes 112 and a plurality of sensing electrodes 114.

The plurality of driving electrodes 112 may be connected to the display driver IC 300 by a plurality of driving electrode lines 1122, and plurality of sensing electrodes 114 may be connected to the display driver IC 300 by a plurality of sensing electrode lines 1142.

For example, the plurality of driving electrodes 112 and the plurality of sensing electrodes 114 may perform a function of a common electrode when the display device with an integrated touch screen operates in a display driving mode. When the display device with an integrated touch screen operates in a touch driving mode, the plurality of driving electrodes 112 may perform a function of a touch driving electrode, and the plurality of sensing electrodes 114 may perform a function of a touch sensing electrode.

In other words, each of the driving electrode and sensing electrode of the display device with an integrated touch screen according to embodiments of the present invention is the common electrode, and may perform a function of a touch electrode as well as a function of a display electrode.

In an embodiment of the present invention, the plurality of driving electrodes 112 may be formed in parallel in a width direction that is a gate line (not shown) direction of the panel 100, and the plurality of sensing electrodes 114 may be disposed between a plurality of sub driving electrodes, and may be formed in parallel in a height direction that is a data line (not shown) direction of the panel 100.

For example, as illustrated in FIG. 3, the plurality of driving electrodes 112 may include first to mth driving electrodes TX#1 to TX#m, and each of the plurality of driving electrodes 112 may include n+1 number of sub driving electrodes 1120. Also, the plurality of sensing electrodes 114 may include first to nth sensing electrodes RX#1 to RX#n. The plurality of sub driving electrodes 1120 may be electrically connected to each other by the plurality of driving electrode lines 1122 in a non-display area A of the panel 100 which is the outside of the display driver IC 300, for configuring one driving electrode. Although not shown, the plurality of sub driving electrodes 1120 may be electrically connected to each other in the display driver IC 300, or may be electrically connected to each other through a connection line in a display area of the panel 100.

The plurality of driving electrodes 112 may be formed as a plurality of block-form common electrodes so as to overlap a plurality of unit pixel areas, and each of the plurality of sensing electrodes 114 may be formed as one block-form common electrode so as to overlap the plurality of unit pixel areas.

Moreover, the plurality of driving electrodes and the plurality of sensing electrodes may act as the common electrode, and thus may be formed of a transparent material such as indium tin oxide (ITO).

While the panel 100 operates in the first display operation period, the gate driver 200 sequentially applies a gate-on voltage to odd-numbered gate lines of a plurality of gate lines GL1 to GL2g during two horizontal periods (2H), and sequentially applies the gate-on voltage to even-numbered gate lines of the plurality of gate lines GL1 to GL2g during two horizontal periods (2H). Here, the gate driver 200 may be provided in the display driver IC 300 or may be separately provided, and for example, the gate driver 200 may be provided in a gate-in panel (GIP) type.

For example, as illustrated in FIG. 5, the gate driver 200 may sequentially apply the gate-on voltage to the odd-numbered gate lines GL1, GL3, . . . , and GL2g−1 during the first display operation period, and may sequentially apply the gate-on voltage to the even-numbered gate lines GL2, GL4, . . . , and GL2g during the second display operation period.

In other words, the gate driver 200 according to embodiments of the present invention uses an interlacing method that separately applies the gate-on voltage to the odd-numbered gate lines and the even-numbered gate lines. Unlike a general interlacing method that applies the gate-on voltage to each of the gate lines during one horizontal period (1H), the gate driver 200 applies the gate-on voltage to each gate line during two horizontal periods (2H).

Therefore, the display device with an integrated touch screen according to embodiments of the present invention increases a gate-on time, and thus, a charging time increases, thereby increasing a quality of a displayed image.

Subsequently, in the first display operation period, the display driver IC 300 applies data voltages corresponding to an odd-numbered gate line to the plurality of data lines during one horizontal period (1H), and in the second display operation period, the display driver IC 300 applies data voltages corresponding to an even-numbered gate line to the plurality of data lines during one horizontal period (1H).

For example, as illustrated in FIG. 5, the display driver IC 300 may respectively apply data voltages to a plurality of data lines DL during one horizontal period (1H) for each data voltage corresponding to an odd-numbered gate line in the first display operation period, and in the second display operation period, the display driver IC 300 may respectively apply data voltages to the plurality of data lines DL during one horizontal period (1H) for each data voltage corresponding to an even-numbered gate line.

That is, data voltages are respectively output to only data lines corresponding to an odd-numbered gate line in the first display operation period, and in the second display operation period, data voltages are respectively output to only data lines corresponding to an even-numbered gate line. Therefore, as described above, although the gate-on time increases in the first and second display operation periods, an output of a data voltage is not affected by the increased gate-on time.

Moreover, as illustrated in FIG. 5, in the first and second touch operation periods, the display driver IC 300 may apply a ground voltage GND to the plurality of data lines DL or float the plurality of data lines DL.

In the first and second touch operation periods, the display driver IC 300 may apply the ground voltage to one or some of the plurality of data lines which overlap(s) the plurality of driving electrodes, and float one or some of the plurality of data lines which overlap(s) the plurality of driving electrodes.

Moreover, the display driver IC 300 generates a common voltage (Vcom) to apply the common voltage to the plurality of driving electrodes 112 in the first and second display operation periods where the panel 100 operates in the display driving mode. Also, in the first and second touch operation periods where the panel 100 operates in the touch driving mode, the display driver IC 300 generates a driving pulse according to a timing pulse to apply the driving pulse to the plurality of driving electrodes 112, and respectively receives a plurality of sensing signals from the plurality of sensing electrodes 114 to transfer the sensing signals to the touch IC 400.

For example, as illustrated in FIG. 5, the display driver IC 300 may apply the driving pulse to the plurality of driving electrodes TX#1 to TX#m in the first and second touch operation periods.

That is, in order for the plurality of driving electrodes and the plurality of sensing electrodes to perform a function of the common electrode and a function of the touch electrode, by dividing a time, the display driver IC 300 applies the common voltage to the plurality of driving electrodes in the first and second display operation periods, and in the first and second touch operation periods, the display driver IC 300 applies the driving pulse to the plurality of driving electrodes and respectively receives the sensing signals from the plurality of sensing electrodes.

For example, the display driver IC 300 may generate the driving pulse by using the timing pulse generated by the touch IC 400, and apply the generated driving pulse to the plurality of driving electrodes. Alternatively, the display driver IC 300 may receive the driving pulse which is directly generated by the touch IC 400, and apply the driving pulse to the plurality of driving electrodes. Here, the timing pulse includes only timing information of the driving pulse, and the display driver IC generates the driving pulse having the maximum voltage VTX_HIGH and the driving pulse having the minimum voltage VTX_LOW by using the timing pulse including the timing information of the driving pulse.

To this end, as illustrated in FIG. 4, the display driver IC 300 may include a common voltage generator 310, a driving pulse generator 320, a sync signal generator 330, and a common voltage switching unit 340.

The common voltage generator 310 generates the common voltage (Vcom) used to drive liquid crystal, and outputs the common voltage to the common voltage switching unit 340.

The driving pulse generator 320 generates a touch pulse by using a first touch pulse generated by a driver 410 of the touch IC 400.

For example, the driving pulse generator 320 may be a level shifter that converts a voltage. The driving pulse generator 320 may generate the touch pulse having the maximum voltage VTX_HIGH and the minimum voltage VTX_LOW by using timing information of the first touch pulse generated by the touch IC 400.

The sync signal generator 330 generates a sync signal (Touch Sync) which indicates a period based on a driving mode of the panel 100. Here, the sync signal may include a first sync signal, which indicates the first and second display operation periods corresponding to the display driving mode, and a second sync signal which indicates the first and second touch operation periods corresponding to the touch driving mode.

For example, the sync signal generator 330 generates the first sync signal indicating the first and second display operation periods to output the first sync signal to the common voltage switching unit 340 and the touch IC 400 in the first and second display operation periods where the panel 100 operates in the display driving mode, and in the first and second touch operation periods where the panel 100 operates in the touch driving mode, the sync signal generator 330 generates the second sync signal indicating the first and second touch operation periods to output the second sync signal to the common voltage switching unit 340 and the touch IC 400.

When the first sync signal is input, the common voltage switching unit 340 connects the common voltage generator 310 to the plurality of driving electrodes and the plurality of sensing electrodes, and thus, the common voltage (Vcom) is applied to the plurality of driving electrodes and the plurality of sensing electrodes. Also, when the second sync signal is input, the common voltage switching unit 340 connects the driving pulse generator 320 to the plurality of driving electrodes and connects a sensing unit 420 of the touch IC 400 to the plurality of sensing electrodes, and thus, the driving pulse is applied to the plurality of driving electrodes, and the sensing signals are respectively received from the plurality of sensing electrodes.

The touch IC 400 generates the timing pulse by using the driver 410, and outputs the timing pulse to the driving pulse generator 320. The touch IC 400 applies a touch sensing reference voltage VRX_REF to the sensing unit 420.

The sync signal generated by the sync signal generator 330 of the display driver IC 300 is applied to the driver 410 and the sensing unit 420, and the driver 410 and the sensing unit 420 operate according to the sync signal generated by the sync signal generator 330.

For example, when the second sync signal indicating the first and second touch operation periods is input, the driver 410 generates the timing pulse to output the timing pulse to the driving pulse generator 320 of the display driver IC 300, and the sensing unit 420 receives the sensing signals from the display driver IC 300 to determine whether there is a touch.

The sensing unit 420 may include an operational amplifier (not shown) and an analog-to-digital converter (ADC, not shown) which correspond to each of the plurality of sensing electrodes 114.

For example, the operational amplifier (not shown) may include a non-inverting input terminal receiving the touch sensing reference voltage VRX_REF, an inverting input terminal connected to one of the plurality of sensing electrodes, and an output terminal connected to the ADC (not shown).

In detail, when the touch sensing reference voltage VRX_REF is applied to the non-inverting input terminal of the operational amplifier (not shown), the inverting input terminal should form a virtual ground with the non-inverting input terminal in terms of an operating characteristic of the operational amplifier, and thus, the touch sensing reference voltage VRX_REF may be substantially applied to the sensing electrode 114.

Although the driving electrode 112 is not electrically connected to the sensing electrode 114, a mutual capacitance change between the driving electrode 112 and the sensing electrode 114 occurs due to the touch pulse applied to the driving electrode 112. The operational amplifier (not shown) integrates the mutual capacitance change to output a voltage corresponding to the mutual capacitance change to the ADC (not shown), or transfers the mutual capacitance change as the voltage to the ADC (not shown).

The ADC (not shown) converts the voltage, output from the operational amplifier, into a digital code. Also, the sensing unit 420 may include a touch analyzer (not shown) that analyzes a digital code, which is generated through conversion by the ADC (not shown) and corresponds to the mutual capacitance change, to determine whether there is a touch.

In order to output an image to the panel 100, the display driver IC 300 generates a gate control signal and a data control signal by using a timing signal transferred from an external system, and realigns input video data so as to match a pixel structure of the panel 100.

To this end, the display driver IC 300 may include a data driver, which respectively applies image data signals to the plurality of data lines, and a controller that controls the elements.

The touch IC 400 generates a first touch pulse including only timing information of the touch pulse to apply the first touch pulse to the display driver IC 300, and receives the sensing signals from the display driver IC 300 to determine whether there is a touch. In this case, as described above, the display driver IC 300 may generate the touch pulse having the maximum voltage VTX_HIGH and the minimum voltage VTX_LOW by using the first touch pulse.

In another embodiment, the touch IC 400 may generate the touch pulse having the maximum voltage VTX_HIGH and the minimum voltage VTX_LOW. In this case, as described above, the display drive IC 300 may apply the touch pulse, transferred from the touch IC 400, to the plurality of driving electrodes.

To this end, the touch IC 400 includes the driver 410 and the sensing unit 420. Here, as illustrated in FIG. 2, the touch IC 400 may be connected to the display driver IC 300 through a flexible printed circuit board (FPCB) 301.

The driver 410 generates the timing pulse to apply the timing pulse to the display driver IC 300, and the sensing unit 420 receives the sensing signals from the display driver IC 300 to determine whether there is a touch. Also, the touch sensing reference voltage VRX_REF is applied to the sensing unit 420, and is substantially applied to the sensing electrode by the operational amplifier included in the sensing unit 420.

Therefore, the touch IC 400 may determine whether there is a touch according to a shift of a voltage caused by a capacitance change between the driving electrode and the sensing electrode, based on the touch sensing reference voltage VRX_REF.

Figure 6:
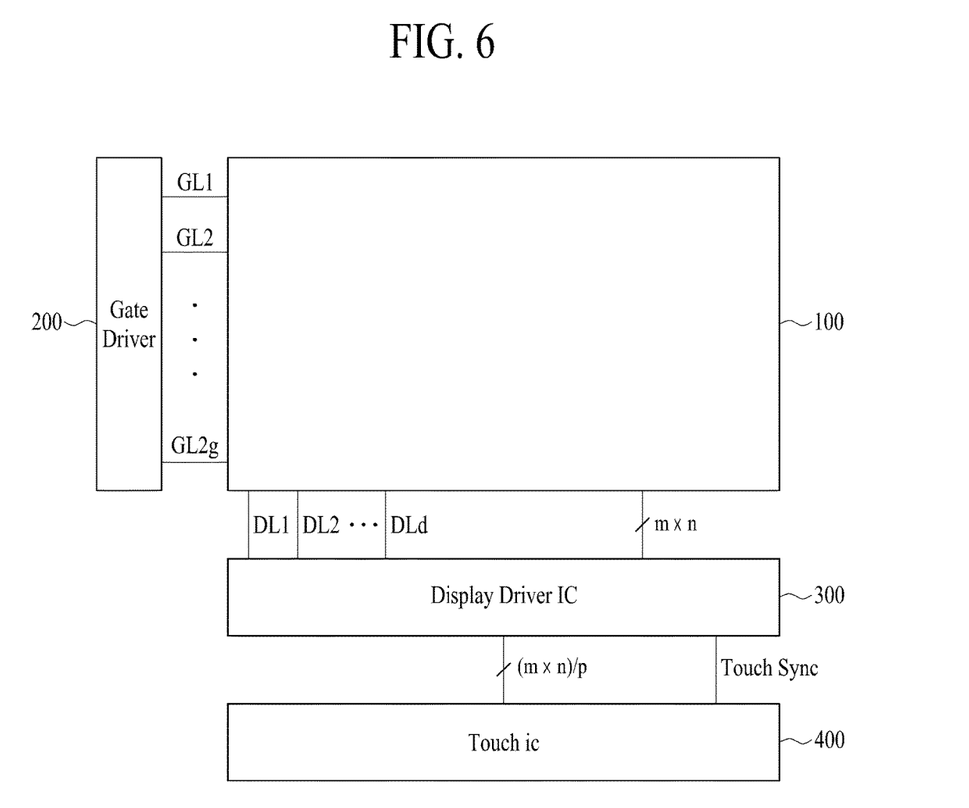
FIG. 6 is a diagram schematically illustrating a configuration of a display device with an integrated touch screen according to one of embodiments of the present invention.

FIG. 6 is a diagram schematically illustrating a configuration of a display device with an integrated touch screen according to one of embodiments of the present invention. FIG. 7 is a diagram illustrating a detailed shape of a touch electrode built into a panel and configurations of a display driver IC and a touch IC illustrated in FIG. 6. FIG. 8 is a timing chart for describing a method of driving the display device with an integrated touch screen illustrated in FIG. 6. Hereinafter, details described above with reference to FIGS. 1 to 5 will be briefly described.

As illustrated in FIG. 6, the display device with an integrated touch screen includes a panel 100, a gate driver 200, a display driver IC 300, and a touch IC 400.

The panel 100 includes a plurality of gate lines, a plurality of data lines, and a touch electrode which intersects the plurality of gate lines and the plurality of data lines.

Figure 7:
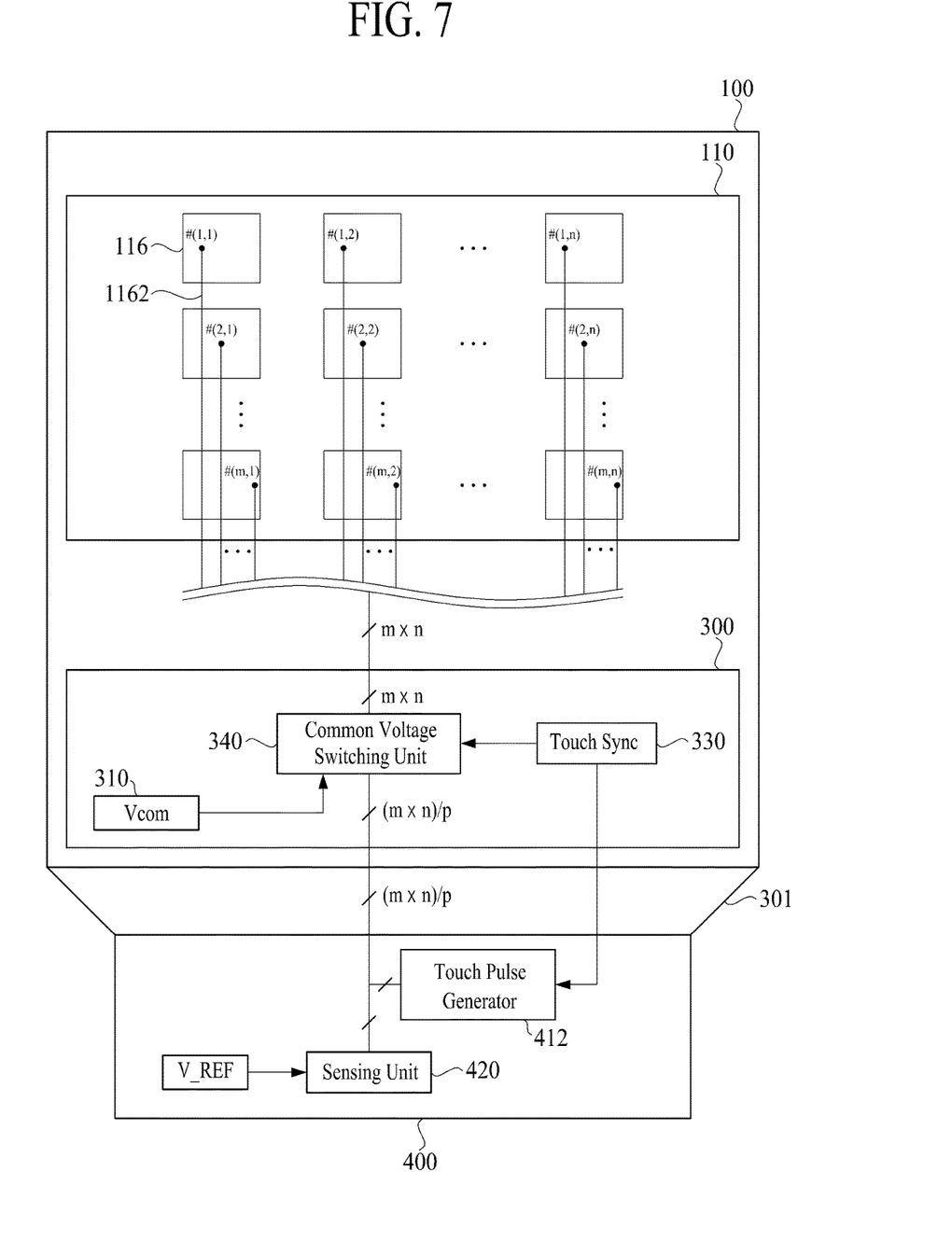
FIG. 7 is a diagram illustrating a detailed shape of a touch electrode built into a panel and configurations of a display driver IC and a touch IC illustrated in FIG. 6.

For example, as illustrated in FIG. 7, a touch screen 110 including the touch electrode is built into the panel 100, and may include a plurality of scan electrodes 116 as the touch electrode.

The plurality of scan electrodes 116 may be connected to the display driver IC 300 by a plurality of scan electrode connection lines 1162.

For example, the plurality of scan electrodes 116 may perform a function of a common electrode when the display device with an integrated touch screen operates in a display driving mode. When the display device with an integrated touch screen operates in a touch driving mode, the plurality of scan electrodes 116 may perform a function of a touch electrode.

In other words, the scan electrode of the display device with an integrated touch screen according to embodiments of the present invention is the common electrode, and may perform a function of the touch electrode as well as a function of the display electrode.

In an embodiment, the plurality of scan electrodes 116 may be formed in a block form so as to overlap a plurality of unit pixel areas.

For example, as illustrated in FIG. 7, the plurality of scan electrodes 116 are m×n number of block-form common electrodes which are arranged in m rows, n columns, and may be formed to overlap the plurality of unit pixel areas. The plurality of scan electrodes 116 may be connected to the display driver IC 300 through m×n number of scan electrode connection lines 1162. Here, m and n are integers equal to or more than one.

The m×n scan electrodes 116 may be divided into p number of groups, and the touch pulse may be temporally divided and applied to the p groups. Each of the p groups may include (m×n)/p number of scan electrodes. Here, m and n are integers equal to or more than one, and p is an integer equal to or more than one and is an aliquot part of m×n.

Moreover, the plurality of scan electrodes may act as the common electrode, and thus may be formed of a transparent material such as indium tin oxide (ITO).

While the panel 100 operates in the first display operation period, the gate driver 200 sequentially applies a gate-on voltage to odd-numbered gate lines of a plurality of gate lines GL1 to GL2g during two horizontal periods (2H), and sequentially applies the gate-on voltage to even-numbered gate lines of the plurality of gate lines GL1 to GL2g during two horizontal periods (2H). Here, the gate driver 200 may be provided in the display driver IC 300 or may be separately provided, and for example, the gate driver 200 may be provided in the GIP type.

Figure 8:
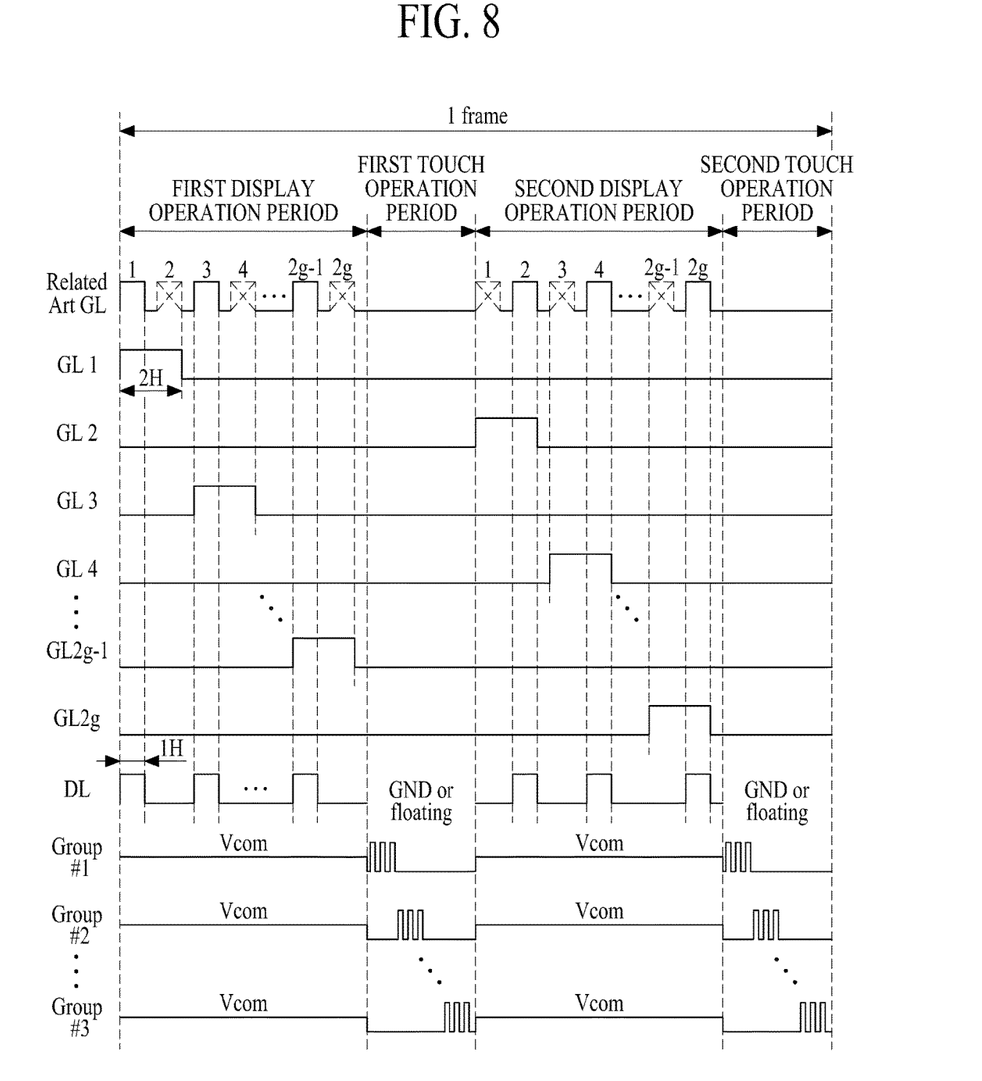
FIG. 8 is a timing chart for describing a method of driving the display device with an integrated touch screen illustrated in FIG. 6.

For example, as illustrated in FIG. 8, the gate driver 200 may sequentially apply the gate-on voltage to the odd-numbered gate lines GL1, GL3, . . . , and GL2g−1 during the first display operation period, and may sequentially apply the gate-on voltage to the even-numbered gate lines GL2, GL4, . . . , and GL2g during the second display operation period.

In other words, the gate driver 200 according to embodiments of the present invention uses an interlacing method that separately applies the gate-on voltage to the odd-numbered gate lines and the even-numbered gate lines. Unlike a general interlacing method that applies the gate-on voltage to each of the gate lines during one horizontal period (1H), the gate driver 200 applies the gate-on voltage to each gate line during two horizontal periods (2H).

Therefore, the display device with an integrated touch screen according to embodiments of the present invention increases a gate-on time, and thus, a charging time increases, thereby increasing a quality of a displayed image.

Subsequently, in the first display operation period, the display driver IC 300 applies data voltages corresponding to an odd-numbered gate line to the plurality of data lines during one horizontal period (1H), and in the second display operation period, the display driver IC 300 applies data voltages corresponding to an even-numbered gate line to the plurality of data lines during one horizontal period (1H).

For example, as illustrated in FIG. 8, the display driver IC 300 may respectively apply data voltages to a plurality of data lines DL during one horizontal period (1H) for each data voltage corresponding to an odd-numbered gate line in the first display operation period, and in the second display operation period, the display driver IC 300 may respectively apply data voltages to the plurality of data lines DL during one horizontal period (1H) for each data voltage corresponding to an even-numbered gate line.

That is, data voltages are respectively output to only data lines corresponding to an odd-numbered gate line in the first display operation period, and in the second display operation period, data voltages are respectively output to only data lines corresponding to an even-numbered gate line. Therefore, as described above, although the gate-on time increases in the first and second display operation periods, an output of a data voltage is not affected by the increased gate-on time.

Moreover, as illustrated in FIG. 8, in the first and second touch operation periods, the display driver IC 300 may apply a ground voltage GND to the plurality of data lines DL or float the plurality of data lines DL.

In the first and second touch operation periods, the display driver IC 300 may apply the ground voltage to one or some of the plurality of data lines which overlap(s) the plurality of driving electrodes, and float one or some of the plurality of data lines which overlap(s) the plurality of driving electrodes.

Moreover, the display driver IC 300 generates the common voltage (Vcom) to apply the common voltage to the plurality of driving electrodes 112 in the first and second display operation periods where the panel 100 operates in the display driving mode. Also, in the first and second touch operation periods where the panel 100 operates in the touch driving mode, the display driver IC 300 applies the touch pulse to the plurality of scan electrodes 116, and respectively receives a plurality of sensing signals from the plurality of scan electrodes 116 to transfer the sensing signals to the touch IC 400.

For example, as illustrated in FIG. 8, the display driver IC 300 may apply the touch pulse to the p groups Group#1 to Group#p through time division in the first and second touch operation periods.

That is, in order for the plurality of scan electrodes to perform a function of the common electrode and a function of the touch electrode, by dividing a time, the display driver IC 300 applies the common voltage in the first and second display operation periods, and in the first and second touch operation periods, the display driver IC 300 applies the touch pulse to the plurality of scan electrodes and respectively receives the sensing signals from the plurality of scan electrodes.

To this end, as illustrated in FIG. 7, the display driver IC 300 may include a common voltage generator 310, a sync signal generator 330, and a common voltage switching unit 340.

The common voltage generator 310 generates the common voltage (Vcom) used to drive liquid crystal, and outputs the common voltage to the common voltage switching unit 340.

The sync signal generator 330 generates a sync signal (Touch Sync) which indicates a period based on a driving mode of the panel 100. Here, the sync signal may include a first sync signal, which indicates the first and second display operation periods corresponding to the display driving mode, and a second sync signal which indicates the first and second touch operation periods corresponding to the touch driving mode.

For example, the sync signal generator 330 generates the first sync signal indicating the first and second display operation periods to output the first sync signal to the common voltage switching unit 340 and the touch IC 400 in an image display period where the panel 100 operates in the display driving mode, and in a touch sensing period where the panel 100 operates in the touch driving mode, the sync signal generator 330 generates the second sync signal indicating the first and second touch operation periods to output the second sync signal to the common voltage switching unit 340 and the touch IC 400.

When the first sync signal is input, the common voltage switching unit 340 connects the common voltage generator 310 to the plurality of scan electrodes, and thus, the common voltage (Vcom) is applied to the plurality of scan electrodes. Also, when the second sync signal is input, the common voltage switching unit 340 connects the touch IC 400 to the plurality of scan electrodes, and thus, the touch pulse is applied to the plurality of scan electrodes, and the sensing signals are respectively received from the plurality of scan electrodes.

In an embodiment, the common voltage switching unit 340 may divide m×n scan electrodes into p number of groups, and apply the touch pulse to the p groups. In this case, the number of channels of the touch pulse applied to the common voltage switching unit 340 may be (m×n)/p number for each of the p groups. Here, m and n are integers equal to or more than one, and p is an integer equal to or more than one and is an aliquot part of m×n.

For example, when it is assumed that p=2, as illustrated in FIG. 8, the common voltage switching unit 340 may divide a time at every first and second touch operation periods, apply the touch pulse to a plurality of scan electrodes included in a first group Group#1, and apply the touch pulse to a plurality of scan electrodes included in a second group Group#2.

In order to output an image to the panel 100, the display driver IC 300 generates a gate control signal and a data control signal by using a timing signal transferred from an external system, and realigns input video data so as to match a pixel structure of the panel 100.

To this end, the display driver IC 300 may include a data driver, which respectively applies image data signals to the plurality of data lines, and a controller that controls the elements.

The touch IC 400 may generate the touch pulse having the maximum voltage VTX_HIGH and the minimum voltage VTX_LOW, apply the touch pulse to the display driver IC 300, and receive the sensing signals from the display driver IC 300 to determine whether there is a touch.

To this end, as illustrated in FIG. 7, the touch IC 400 includes a touch pulse generator 412 and a sensing unit 420. Here, the touch IC 400 may be connected to the display driver IC 300 through an FPCB 301.

The touch pulse generator 412 generates the touch pulse according to the sync signal generated by the sync signal generator 330 to apply the touch pulse to the common voltage switching unit 340 of the display driver IC 300, and the sensing unit 420 receives the sensing signals from the common voltage switching unit 340 of the display driver IC 300 to determine whether there is a touch.

For example, the touch pulse generator 412 may apply the touch pulse for each of (m×n)/p number of channels output to the display driver IC 300. Also, the sensing unit 420 may be connected to a comparator (not shown) for each of the (m×n)/p channels. A first input terminal of the comparator may be connected to a corresponding channel, and a second input terminal may receive a touch reference voltage V_REF. A capacitor (not shown) having a certain size may be connected between each channel and a ground.

Therefore, the touch IC 400 may determine whether there is a touch according to a self-capacitance change of the scan electrode, based on the touch reference voltage V_REF.

Accordingly, the display device with an integrated touch screen according to embodiments of the present invention increases the gate-on time in the mutual capacitance type or the self-capacitance type, and thus enhances a quality of a displayed image, thereby improving display performance.

Hereinafter, a method of driving the display device with an integrated touch screen according to embodiments of the present invention will be described in detail with reference to FIGS. 5 and 8.

As illustrated in FIGS. 5 and 8, the display device with an integrated touch screen according to embodiments of the present invention may operate in the first display operation period, the first touch operation period, the second display operation period, and the second touch operation period in each frame.

First, in the first display operation period, the gate driver sequentially applies the gate-on voltage to the odd-numbered gate lines GL1, GL3, . . . , and GL2g−1 among the plurality of gate lines during two horizontal periods (2H), and the display driver IC respectively applies data voltages to a plurality of data lines corresponding to the odd-numbered gate lines during one horizontal period (1H).

Moreover, the display driver IC applies the common voltage (Vcom) to the touch electrode in the first display operation period.

For example, in the mutual capacitance type, as illustrated in FIG. 5, the display driver IC may apply the common voltage to the plurality of driving electrodes TX#1 to TX#m and the plurality of sensing electrodes (not shown). Also, in the self-capacitance type, as illustrated in FIG. 8, the display driver IC may apply the common voltage to the plurality of scan electrodes Group#1 to Group#m.

Subsequently, in the first touch operation period, the display driver IC may apply the touch pulse to a plurality of electrodes, and the touch IC may determine whether there is a touch by using a plurality of sensing signals generated from the plurality of electrodes.

For example, in the mutual capacitance type, the display driver IC may apply the driving pulse as the touch pulse to the plurality of driving electrodes and receive the sensing signals from the plurality of sensing electrodes to transfer the sensing signals to the touch IC, and the touch IC may determine whether there is a touch by using the sensing signals. Also, in the self-capacitance type, the display driver IC may apply the touch pulse to the plurality of scan electrodes and receive the sensing signals from the plurality of scan electrodes to transfer the sensing signals to the touch IC, and the touch IC may determine whether there is a touch by using the sensing signals.

Subsequently, in the second display operation period, the gate driver sequentially applies the gate-on voltage to the even-numbered gate lines GL2, GL4, . . . , and GL2g among the plurality of gate lines during two horizontal periods (2H), and the display driver IC respectively applies data voltages to a plurality of data lines corresponding to the odd-numbered gate lines during one horizontal period (1H).

Moreover, the display driver IC applies the common voltage (Vcom) to the touch electrode in the second display operation period.

For example, in the mutual capacitance type, as illustrated in FIG. 5, the display driver IC may apply the common voltage to the plurality of driving electrodes TX#1 to TX#m and the plurality of sensing electrodes (not shown). Also, in the self-capacitance type, as illustrated in FIG. 8, the display driver IC may apply the common voltage to the plurality of scan electrodes Group#1 to Group#m.

Subsequently, in the second touch operation period, the display driver IC may apply the touch pulse to a plurality of electrodes, and the touch IC may determine whether there is a touch by using a plurality of sensing signals generated from the plurality of electrodes.

For example, in the mutual capacitance type, the display driver IC may apply the driving pulse as the touch pulse to the plurality of driving electrodes and receive the sensing signals from the plurality of sensing electrodes to transfer the sensing signals to the touch IC, and the touch IC may determine whether there is a touch by using the sensing signals. Also, in the self-capacitance type, the display driver IC may apply the touch pulse to the plurality of scan electrodes and receive the sensing signals from the plurality of scan electrodes to transfer the sensing signals to the touch IC, and the touch IC may determine whether there is a touch by using the sensing signals.

Accordingly, the method of driving the display device with an integrated touch screen according to embodiments of the present invention increases the gate-on time in the mutual capacitance type or the self-capacitance type, and thus enhances a quality of a displayed image, thereby improving display performance.

According to the embodiments of the present invention, in the mutual capacitance type and the self-capacitance type, the gate-on time increases, and thus, a quality of a displayed image can be improved.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device with an integrated touch screen, the display device comprising:
    a panel configured to operate in a first display operation period, a first touch operation period, a second display operation period, and a second touch operation period, and include a touch electrode overlapping a plurality of gate lines and a plurality of data lines;
    a gate driver configured to sequentially apply a gate-on voltage to odd-numbered gate lines among the plurality of gate lines for two or more horizontal periods in the first display operation period, and in the second display operation period, sequentially apply the gate-on voltage to even-numbered gate lines among the plurality of gate lines for two or more horizontal periods, wherein the gate-on voltage is applied for two or more horizontal periods to only one gate line among the plurality of gate lines at a time; and
    a display driver IC configured to apply a common voltage to the touch electrode in the first and second display operation periods, and apply the touch pulse to the touch electrode and receive a sensing signal from the touch electrode in the first and second touch operation periods,
    wherein the first display operation period, the first touch operation period, the second display operation period, and the second touch operation period are included in one frame,
    wherein the gate-on voltage is not applied to the even-numbered gate lines for the first display operation period and the gate-on voltage is not applied to the odd-numbered gate lines for the second display operation period, and
    wherein, in first display operation period, the two horizontal periods in which the gate-on voltage is applied includes a first one horizontal period in which data voltages are applied to the plurality of data lines and a second one horizontal period in which no data voltages are applied to the plurality of data lines.

2. The display device of claim 1, wherein the touch electrode comprises a plurality of block-form scan electrodes formed to overlap a plurality of unit pixel areas.

3. The display device of claim 1, further comprising a touch IC configured to generate the touch pulse to output the touch pulse to the display driver IC, and determine whether there is a touch by using the sensing signal transferred from the display driver IC.

4. The display device of claim 1, wherein the gate driver is provided in a gate-in panel type.

5. The display device of claim 1, wherein, in the second display operation, the two horizontal periods in which the gate-on voltage is applied includes a first one horizontal period in which no data voltages are applied to the plurality of data lines and a second one horizontal period in which data voltages are applied to the plurality of data lines.

6. The display device of claim 5, wherein, in the first display operation, when the first one horizontal period ends, the second one horizontal period in which no data voltages are applied extends to the end of the two horizontal periods.

7. A display device with an integrated touch screen, the display device comprising:
    a panel configured to operate in a first display operation period, a first touch operation period, a second display operation period, and a second touch operation period, and include a touch electrode overlapping a plurality of gate lines and a plurality of data lines, the touch electrode comprising a plurality of driving electrodes and a plurality of sensing electrodes;
    a gate driver configured to sequentially apply a gate-on voltage to odd-numbered gate lines among the plurality of gate lines for two or more horizontal periods in the first display operation period, and in the second display operation period, sequentially apply the gate-on voltage to even-numbered gate lines among the plurality of gate lines for two or more horizontal periods, wherein the gate-on voltage is applied for two or more horizontal periods to only one gate line among the plurality of gate lines at a time; and
    a display driver IC configured to apply a common voltage to the plurality of driving electrodes and the plurality of sensing electrodes in the first and second display operation periods, and in the first and second touch operation periods, generate a driving pulse according to a timing pulse to apply the driving pulse to the plurality of driving electrodes and respectively receive a plurality of sensing signals from the plurality of sensing electrodes,
    wherein the first display operation period, the first touch operation period, the second display operation period, and the second touch operation period are included in one frame,
    wherein the gate-on voltage is not applied to the even-numbered gate lines for the first display operation period and the gate-on voltage is not applied to the odd-numbered gate lines for the second display operation period, and
    wherein, in the first display operation period, the two horizontal periods in which the gate-on voltage is applied includes a first one horizontal period in which data voltages are applied to the plurality of data lines and a second one horizontal period in which no data voltages are applied to the plurality of data lines.

8. The display device of claim 7, further comprising a touch IC configured to generate the timing pulse to output the timing pulse to the display driver IC, and determine whether there is a touch by using the plurality of sensing signals transferred from the display driver IC.

9. The display device of claim 7, wherein the gate driver is provided in a gate-in panel type.

10. The display device of claim 7, wherein, in the second display operation, the two horizontal periods in which the gate-on voltage is applied includes a first one horizontal period in which no data voltages are applied to the plurality of data lines and a second one horizontal period in which data voltages are applied to the plurality of data lines.

11. The display device of claim 10, wherein, in the first display operation, when the first one horizontal period ends, the second one horizontal period in which no data voltages are applied extends to the end of the two horizontal periods.

12. A method of driving a display device with an integrated touch screen, comprising a panel configured to operate in a first display operation period, a first touch operation period, a second display operation period, and a second touch operation period, and include a touch electrode overlapping a plurality of gate lines and a plurality of data lines; a gate driver; and a display driver IC, the method comprising:
- sequentially applying, by the gate driver, a gate-on voltage to odd-numbered gate lines among the plurality of gate lines for two or more horizontal periods in the first display operation period; and
- sequentially applying, by the gate driver, the gate-on voltage to even-numbered gate lines among the plurality of gate lines for two or more horizontal periods in the second display operation period,
- wherein the gate-on voltage is applied for two or more horizontal periods to only one gate line among the plurality of gate lines at a time,
- wherein the display driver IC applies a common voltage to the touch electrode in the first and second display operation periods,
- wherein the display driver IC applies the touch pulse to the touch electrode and receives a sensing signal from the touch electrode in the first and second touch operation periods,
- wherein the first display operation period, the first touch operation period, the second display operation period, and the second touch operation period are included in one frame,
- wherein the gate-on voltage is not applied to the even-numbered gate lines for the first display operation period and the gate-on voltage is not applied to the odd-numbered gate lines for the second display operation period, and
- wherein, during the first display operation period, the two horizontal periods in which the gate-on voltage is applied includes a first one horizontal period in which data voltages are applied to the plurality of data lines and a second one horizontal period in which no data voltages are applied to the plurality of data lines.

13. The method of claim 12, wherein, in the second display operation, the two horizontal periods in which the gate-on voltage is applied includes a first one horizontal period in which no data voltages are applied to the plurality of data lines and a second one horizontal period in which data voltages are applied to the plurality of data lines.

14. The method of claim 13, wherein, in the first display operation, when the first one horizontal period ends, the second one horizontal period in which no data voltages are applied extends to the end of the two horizontal periods.

15. A method of driving a display device with an integrated touch screen, comprising a panel configured to operate in a first display operation period, a first touch operation period, a second display operation period, and a second touch operation period, and include a touch electrode overlapping a plurality of gate lines and a plurality of data lines; a gate driver; and a display driver IC, the method comprising:
- sequentially applying, by the gate driver, a gate-on voltage to odd-numbered gate lines among the plurality of gate lines for two horizontal periods in the first display operation period; and
- sequentially applying, by the gate driver, the gate-on voltage to even-numbered gate lines among the plurality of gate lines for two horizontal periods in the second display operation period,
- wherein the gate-on voltage is applied for two horizontal periods to only one gate line among the plurality of gate lines at a time,
- wherein the display driver IC applies a common voltage to the plurality of driving electrodes and the plurality of sensing electrodes in the first and second display operation periods,
- wherein the display driver IC, in the first and second touch operation periods, generates a driving pulse according to a timing pulse to apply the driving pulse to the plurality of driving electrodes and respectively receives a plurality of sensing signals from the plurality of sensing electrodes,
- wherein the first display operation period, the first touch operation period, the second display operation period, and the second touch operation period are included in one frame,
- wherein the gate-on voltage is not applied to the even-numbered gate lines for the first display operation period and the gate-on voltage is not applied to the odd-numbered gate lines for the second display operation period, and
- wherein, during the first display operation period, the two horizontal periods in which the gate-on voltage is applied includes a first one horizontal period in which data voltages are applied to the plurality of data lines and a second one horizontal period in which no data voltages are applied to the plurality of data lines.

16. The method of claim 15, wherein, in the second display operation, the two horizontal periods in which the gate-on voltage is applied includes a first one horizontal period in which no data voltages are applied to the plurality of data lines and a second one horizontal period in which data voltages are applied to the plurality of data lines.

17. The method of claim 16, wherein, in the first display operation, when the first one horizontal period ends, the second one horizontal period in which no data voltages are applied extends to the end of the two horizontal periods.

* * * * *